United States Patent
Liu et al.

(10) Patent No.: US 11,580,868 B2
(45) Date of Patent: Feb. 14, 2023

(54) AR-BASED SUPPLEMENTARY TEACHING SYSTEM FOR GUZHENG AND METHOD THEREOF

(71) Applicant: CHINA ACADEMY OF ART, Hangzhou (CN)

(72) Inventors: Zheng Liu, Hangzhou (CN); Mingfeng He, Hangzhou (CN); Yun Wang, Hangzhou (CN); Huijun Hu, Hangzhou (CN); Donghong Zhou, Hangzhou (CN)

(73) Assignee: CHINA ACADEMY OF ART, Hangzhou (CN)

( * ) Notice: Subject to any disclaimer, the term of this patent is extended or adjusted under 35 U.S.C. 154(b) by 195 days.

(21) Appl. No.: 17/105,935

(22) Filed: Nov. 27, 2020

(65) Prior Publication Data

US 2021/0174690 A1 Jun. 10, 2021

(30) Foreign Application Priority Data

Dec. 6, 2019 (CN) .......................... 2019112391282

(51) Int. Cl.
  *G09B 15/02* (2006.01)
  *G06T 19/00* (2011.01)
  *G10L 25/51* (2013.01)
  *G09B 5/02* (2006.01)
  *G06F 3/01* (2006.01)

(52) U.S. Cl.
  CPC .............. *G09B 5/02* (2013.01); *G06F 3/014* (2013.01); *G06F 3/016* (2013.01); *G06T 19/006* (2013.01); *G09B 15/023* (2013.01); *G10L 25/51* (2013.01)

(58) Field of Classification Search
  CPC ........ G09B 5/02; G09B 15/023; G09B 15/06; G09B 15/003; G06F 3/014; G06F 3/016; G06T 19/006; G10L 25/51
  See application file for complete search history.

(56) References Cited

U.S. PATENT DOCUMENTS 10,186,166 B2 * 1/2019 Gialamas ............... G10H 1/32
2015/0027297 A1 * 1/2015 Avitabile ................ G01L 5/16
  84/470 R (Continued)

FOREIGN PATENT DOCUMENTS

CN 109637271 A 4/2019

*Primary Examiner* — Bryan Earles
(74) *Attorney, Agent, or Firm* — Muncy, Geissler, Olds & Lowe, P.C.

(57) ABSTRACT

An AR-based supplementary teaching system for guzheng and method thereof, the system includes an AR device, a data processing device and positioning devices for key positions, the data processing device is signal-connected to the AR device, and the positioning devices is installed on the guzheng code of guzheng, the positioning devices corresponds to the guzheng code of guzheng one by one; the AR device is used to obtain real scene data; the data processing device is used to guzheng and the positioning devices identify and generate string distribution data; also used to obtain operation instruction based on user actions, execute the operation instruction and generate virtual data; the AR device is also used to convert all data based on the string distribution data The virtual data and the real scene data are superimposed and displayed.

16 Claims, 5 Drawing Sheets

| S100 | setting a positioning device for key positions on each guzheng code of the guzheng |
| S200 | obtaining the real scene data through the AR device, identifying the guzheng and the positioning devices for key positions in the real scene data, and generating the string distribution data |
| S300 | displaying an operation interface for the user by the AR device, obtaining the operation instruction according to the user's actions simultaneously, executing the operation instruction and generating the virtual data, sending the virtual data to the AR device, and the AR device superimposing and displaying the virtual data with the real scene data based on the string distribution data |

(56) References Cited

U.S. PATENT DOCUMENTS

| | | | |
|---|---|---|---|
| 2015/0059556 A1* | 3/2015 | Grafman | G09B 15/002 84/485 R |
| 2015/0317910 A1* | 11/2015 | Daniels | G09B 5/065 434/257 |
| 2017/0352336 A1* | 12/2017 | Dutton | G10D 3/173 |
| 2018/0315329 A1* | 11/2018 | Damato | G09B 5/02 |
| 2018/0336871 A1* | 11/2018 | Hämäläinen | G06T 19/006 |

\* cited by examiner

AR-BASED SUPPLEMENTARY TEACHING SYSTEM FOR GUZHENG AND METHOD THEREOF

CROSS-REFERENCE TO RELATED APPLICATIONS

This Non-provisional application claims priority under 35 U.S.C. § 119(a) on Chinese Patent Application No(s). 2019112391282 filed on Dec. 6, 2019, the entire contents of which are hereby incorporated by reference.

BACKGROUND OF THE INVENTION

Technical Field

The invention relates to a field of virtual reality, in particular to an AR-based supplementary teaching system for guzheng and method thereof.

Description of the Related Art

At present, the guzheng teaching human-computer interaction auxiliary device and system (CN109637271A) discloses an auxiliary device that can provide basic fingering instruction for guzheng, as well as practice feedback guidance, to avoid problems such as confusion, irregular fingering, and uncoordinated left and right hands. But the immersion is poor and requires a lot of peripheral devices to achieve, especially the light bar indicating device, and the light bar indicating device is located below the guzheng code, so replacing the light bar indicating device requires re-tuning the guzheng, which is poor in portability and cumbersome to use, the user experience is low.

BRIEF SUMMARY OF THE INVENTION

In view of the shortcomings in the prior art, the present invention provides an AR-based supplementary teaching system for guzheng and method thereof that can improve user immersion.

In order to solve the above technical problems, the present invention is solved by the following technical solutions:
An AR-based supplementary teaching system for guzheng, including an AR device, a data processing device, and a plurality of positioning devices for key positions, wherein the data processing device is signally connected to the AR device, the positioning devices for key positions are installed on a guzheng code, and each of the positioning devices for key positions corresponds one-to-one with the guzheng code;
the AR device is used to obtain a real scene data;
the data processing device is used to identify the guzheng and the positioning devices for key positions in the real scene data, generating a string distribution data; the data processing device is also used to obtain an operation instruction based on user's actions, executing the operation instruction, and generating a virtual data; and
the AR device is also used to superimpose and display the virtual data with the real scene data based on the string distribution data.

In an implementable embodiment, the system further includes a sound input device, the sound input device is signally connected to the data processing device;
the voice input device is used to collect a sound data when the user plays and send the sound data to the data processing device;
the data processing device is configured to identify the sound data, generate a tone data, retrieve the operation instruction associated with the tone data, execute the operation instruction, and generate the virtual data.

In an implementable embodiment, the data processing device includes a transmission module, an identification module, a storage module, and a processing module, wherein the identification module is signally connected to the sound input device, the transmission module, the storage module, and the processing module respectively, the processing module is also signally connected to the transmission module and the storage module respectively, and the transmission module is signally connected to the AR device;
the identification module is used for receiving and identifying the sound data to obtain the tone data, and for receiving and identifying the real scene data to obtain the string distribution data;
the processing module is used for retrieving the operation instruction associated with the tone data from the storage module, executing the operation instruction, and generating the virtual data according to the operation instruction; and also, for controlling the AR device to superimpose and display the virtual data with the real scene data;
the virtual data includes a string guidance data, a fingering guidance data, and a numbered musical notation display data.

In an implementable embodiment, the system further includes a somatosensory device, the somatosensory device is signally connected to the data processing device;
the data processing device also used to generate a fingering somatosensory guidance data according to the operation instruction, and control the somatosensory device to perform a somatosensory feedback according to the somatosensory guidance data.

In an implementable embodiment,
the somatosensory device includes a wristband and four smart fingers;
each of the smart fingers is provided with a pick installation sleeve, a first vibration feedback device and a second vibration feedback device, wherein all first vibration feedback devices are located on a same side of the pick installation sleeves, all second vibration feedback devices are located on an opposite side of the pick installation sleeves, and each of the pick installation sleeves is used to install a pick;
the wristband is provided with a somatosensory transmission module, a battery module, and a control module, wherein the battery module supplies power to the first vibration feedback devices, the second vibration feedback devices, the somatosensory transmission module, and the control module; the control module is signally connected to the first vibration feedback devices, the second vibration feedback devices, and the somatosensory transmission module respectively; and the somatosensory transmission module is signally connected to the transmission module;
the control module is used for receiving fingering somatosensory guidance data by the somatosensory transmission module, and controlling the first vibration feedback devices and the second vibration feedback devices to perform a vibration feedback according to the fingering somatosensory guidance data.

In an implementable embodiment,
wherein a lower surface of each of the pick installation sleeves is provided with an upper mounting member, a first pressure sensor, and a second pressure sensor; the first pressure sensor is located on a side away from the pick, and the second pressure sensor is located on a side close to the pick side, the first pressure sensor and the second pressure sensor are both signally connected to the control module; wherein an upper surface of each of the smart fingers is provided with a lower mounting member, a first trigger, and a second trigger; the first trigger corresponds to the first pressure sensor, and the second trigger corresponds to the second pressure sensor; the lower mounting member and the upper mounting member are rotatably connected, so that when the pick move the string, the first pressure sensor squeezes the first trigger or the second pressure sensor squeezes the second trigger; wherein the control module is used to receive a pressure data detected by the first pressure sensor and/or the second pressure sensor, and send the obtained pressure data to the data processing device by the somatosensory transmission module, and the data processing device analysis a fingering accuracy according to the pressure data.

In an implementable embodiment, each of the positioning devices for key positions includes an identification panel, a connecting member, and a fixing member; the fixing member is provided with a notch matching a shape of the guzheng code, the fixing member is installed on an upper end of the guzheng code through the notch during positioning; and the identification panel is connected to the fixing member through the connecting member.

In an implementable embodiment, the system further includes a cloud server;

the cloud server is in signal connection with a plurality of data processing devices, and each of the plurality of data processing devices performs data interaction with other data processing devices through the cloud server.

In order to solve the above technical problems, the present invention is also provided with an AR-based supplementary teaching method is realized by using any of the above-mentioned system, wherein the method includes the following steps:

setting a positioning device for key positions on each guzheng code of the guzheng;

obtaining the real scene data through the AR device, identifying the guzheng and the positioning devices for key positions in the real scene data, and generating the string distribution data;

displaying an operation interface for the user by the AR device, obtaining the operation instruction according to the user's actions simultaneously, executing the operation instruction and generating the virtual data, sending the virtual data to the AR device, and the AR device superimposing and displaying the virtual data with the real scene data based on the string distribution data.

In an implementable embodiment, the step of displaying an operation interface for the user by the AR device, obtaining the operation instruction according to the user's actions simultaneously includes:

displaying an operation interface for the user by the AR device, and simultaneously collecting and identify a sound data to obtain a tone data; obtaining an operation data corresponding to the tone data according to a pre-defined operation association rule, and generating operation instruction based on the operation data;

the operation instruction includes a playing guidance instruction and an evaluation instruction; when the operation instruction is the playing guidance instruction, the virtual data includes a string guidance data, a fingering guidance data, and/or a numbered musical notation display data, at which time the operation instruction is executed to generate the virtual data include:

acquiring the operation data according to the user's actions, and extracting a corresponding music score data based on the operation data, the music score data includes a note data and a fingering data; and generating a string guidance data, a fingering guidance data and/or a numbered musical notation display data according to the playing guidance instruction, including:

extracting a corresponding string position according to the note data based on the pre-defined string association rule, and generating a string guidance data;

extracting a corresponding fingering 3D animation based on the pre-defined fingering association rule according to the fingering data, and generating a fingering display guidance data; and extracting a musical notation display data corresponding to the music score data.

In an implementable embodiment, when the operation instruction is the playing guidance instruction, a somatosensory guidance step is also included, and the somatosensory guidance step include:

based on the pre-defined fingering association rule, the corresponding somatosensory feedback data is extracted according to the fingering data to generate a fingering somatosensory guidance data, the fingering somatosensory guidance data is sent to the somatosensory device, and the somatosensory device performs a fingering guidance according to the fingering somatosensory guidance data.

In an implementable embodiment, when the operation instruction is the evaluation instruction, the virtual data includes a string key position accuracy, a fingering accuracy, and a rhythm sense. Currently, the specific steps of executing the operation instruction to generate a virtual data are:

acquiring an operation data according to the user's actions, and extracting corresponding music score data based on the operation data, the music score data including note data, fingering data, and a pre-defined standard interval duration between two notes;

during the user's playing process, collecting, and recognizing the sound data, obtaining tone data and volume data, and at the same time collecting pressure data through a somatosensory device, and identifying the pressure data to obtain playing fingering data;

matching the tone data and volume data with the note data, and generating string key position accuracy according to the matching result;

matching the playing fingering data with the fingering data, and generating fingering accuracy according to the matching result;

calculating a time difference between the pre-defined two notes according to the tone data, obtaining an actual interval duration, and generate a sense of rhythm according to the actual interval duration and the standard interval duration.

In an implementable embodiment, when the operation instruction is an evaluation instruction, the virtual data includes string key position accuracy, fingering accuracy, and rhythm sense. Currently, after executing the operation instruction to generate the virtual data, it also includes feedback guided steps, the specific steps are:

getting string key position accuracy, fingering accuracy, and rhythm sense;

comparing the string key position accuracy with the pre-defined string key position accuracy threshold, comparing the fingering accuracy with the pre-defined fingering accuracy threshold, and comparing the rhythm sense with the pre-defined rhythm sense threshold, and getting the comparison results;

when the fingering accuracy is less than the pre-defined fingering accuracy threshold, extract fingering practice score data;

when the string key position accuracy is less than the pre-defined string key position accuracy threshold, and the fingering accuracy is less than the pre-defined fingering accuracy threshold, extract a wrong paragraph and slow down the playback speed to practice;

when the string key position accuracy is less than the pre-defined string key position accuracy threshold, and the fingering accuracy is greater than or equal to the pre-defined fingering accuracy threshold, extract the wrong paragraph, practice at normal speed first, and then increase the playback speed to practice;

when the rhythm sense is greater than the pre-defined rhythm sense threshold, the rhythm sense practice score data corresponding to the rhythm sense practice rule is extracted according to the pre-defined rhythm sense practice rule.

Since the present invention adopts the above technical solutions, it has significant technical effects:

1. The present invention uses AR technology to improve the user's immersion, and can be used for auxiliary teaching directly on New guzheng. Compared with the existing technology, the portability is high; in the present invention, the virtual data is superimposed and displayed based on the string distribution data, which can be used to guide the strings without the need for a light bar indicator device, so the user does not need to re-tune after the installation of the system is completed, which can improve the user experience compared with the prior art;

2. By designing the first pressure sensor and the second pressure sensor in the somatosensory device, the present invention can collect pressure data for determining the force surface of the corresponding pick, so that the data processing device can analyze the pressure data and the user's fingering principles, and monitor the accuracy of the user's fingering;

3. The present invention can locate the position of each string through the design of the positioning devices for key position, thereby determining the distribution of strings, and can also obtain the playing area of the corresponding string according to the position of the string; The design of the notch on the fixture is convenient for users to install the positioning devices for key position.

4. By designing the cloud server, the present invention enables each user's data processing device to interact through the cloud server, thereby providing users with functions such as multi-person coordination and remote tutoring according to the user's needs.

BRIEF DESCRIPTION OF THE DRAWINGS

In order to explain the embodiments of the present invention or the technical solutions more clearly in the prior art, the following will briefly introduce the drawings required in the embodiments or the description of the prior art. Obviously, the drawings in the following description are only these are some embodiments of the present invention. For those of ordinary skill in the art, without paying any creative labor, other drawings can also be obtained based on these drawings.

In these figures.

100 represents AR device, 200 represents guzheng peripheral device, 210 represents sound input device, 220 represents data processing device, 221 represents transmission module, 222 represents identification module, 223 represents storage module, 224 represents processing module, 300 represents positioning device for key position, 310 represents identification panel, 320 represents connection member, 330 represents fixing member, 340 represents anti-skid sheet, 400 represents somatosensory device, 410 represents wristband, 411 represents control module, 412 represents somatosensory transmission module, 420 represents smart fingers, 421 represents pick installation sleeve, 422 represents first vibration feedback device, 423 represents second vibration feedback device, 424 represents first pressure sensor, 425 represents second pressure sensor, 426 represents first trigger, 427 represents second trigger, 500 represents cloud server.

DETAILED DESCRIPTION OF THE INVENTION

The present invention will be further described in detail below in conjunction with embodiments.

The following embodiments are explanations of the present invention and the present invention is not limited to the following embodiments.

Embodiment 1

Figure 1:
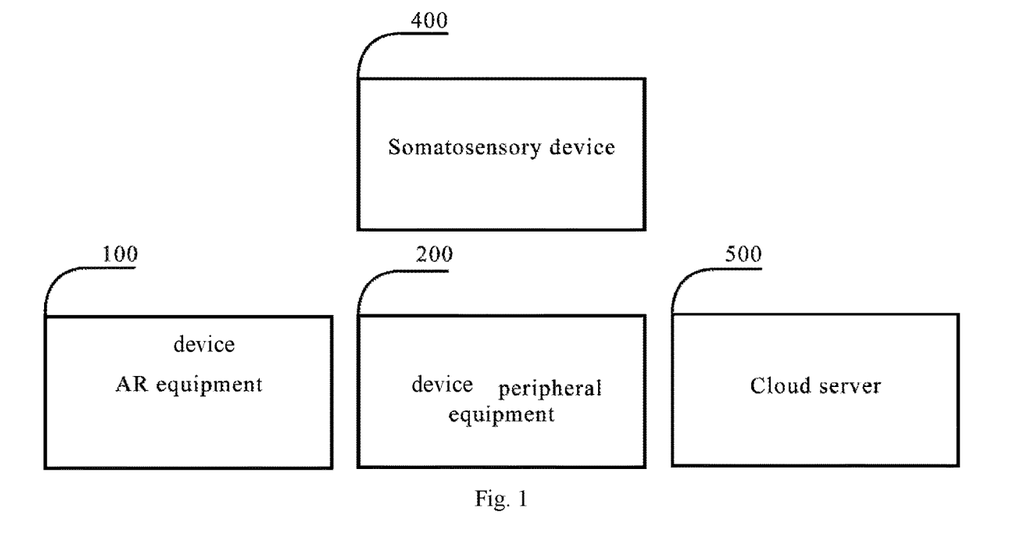
FIG. 1 is a schematic diagram of module connections of an AR-based supplementary teaching system for guzheng of the present invention.

An AR-based supplementary teaching system for guzheng (hereinafter referred to as a teaching system), as shown in FIG. 1, includes an AR device 100, a guzheng peripheral device No. 200, and several positioning devices for key positions 300, the guzheng peripheral device 200 is signally connected to the AR device 100, the positioning devices for key position 300 is installed on the guzheng code, and the positioning devices for key position 300 corresponds to the guzheng code one-to-one;

In this embodiment, the guzheng peripheral device 200 includes a signally connected sound input device 210 and a data processing device 220, wherein the data processing device 220 is signally connected to the AR device 100.

The AR device 100 is used to obtain a real scene data.

The data processing device 220 is used to identify the guzheng and the positioning devices for key position 300 in the real scene data to generate a string distribution data; it is also used to obtain an operation instruction according to user actions, executing the operation instruction and generate a virtual data;

The AR device 100 is further configured to obtain the virtual data, and superimpose and display the virtual data with the real scene data based on the string distribution data.

In this embodiment, the AR device 100 may use existing AR glasses or a head-mounted AR display device;

This embodiment uses AR technology to improve user immersion. In this embodiment, the virtual data is superimposed and displayed based on the string distribution data, which can be used to guide the strings without the need for a light bar indicator device, so the user does not need to re-tune after the installation of the system is completed, which can improve the user experience compared with the prior art Due to the different shapes of the guzheng, the different playing areas of each guzheng, and the thin strings, the identification accuracy of direct string identification is low, so it is not possible to directly use AR technology to superimpose virtual scenes. If there is a deviation between the virtual scene and the real scene, it cannot assist the user to practice. For this problem, in this embodiment, the positioning devices for key position 300 is used to solve the problem.

Figure 2:
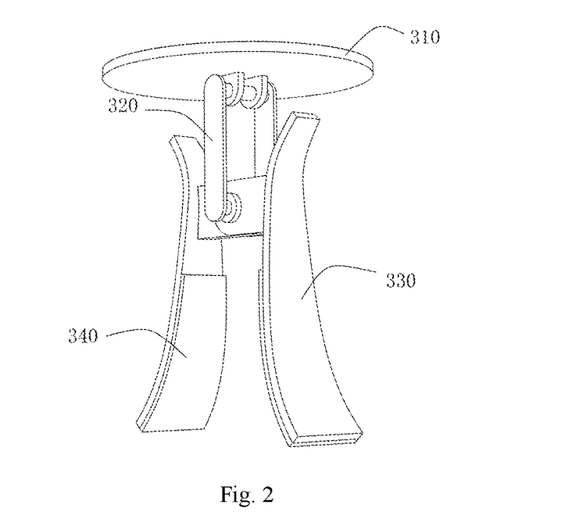
FIG. 2 is a schematic structural view of the key position positioning device 300 in Embodiment 1.
Figure 3:
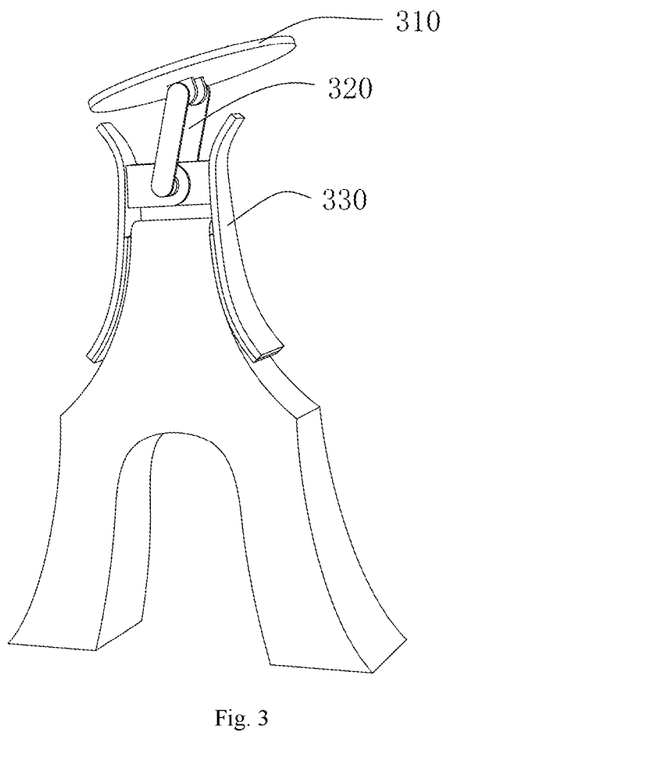
FIG. 3 is a schematic view of a use state of the positioning device for key position 300 in FIG. 2.

As shown in FIG. 2, the positioning devices for key position 300 includes an identification panel 310, a connecting member 320 and a fixing member 330, wherein the fixing member 330 is provided with a notch matching a shape of the guzheng code, and the fixing member 330 is installed on an upper end of the guzheng code through the notch during positioning (as shown in FIG. 3); the identification panel 310 is connected with the fixing member 330 by a connecting member 320;

In this embodiment, the positioning devices for key position 300 further includes a non-slip sheet 340, which is installed on a contact surface (notch) of the fixing member 330 and the guzheng code, which enhances a friction between the fixing member 330 and the guzheng code, and effectively prevents fixing member 330 from slipped off the guzheng code;

In this embodiment, the identification panel 310 is rotatably connected to the connection member 320, and the connection member 320 is rotatably connected to the fixing member 330, so that the tilt angle of the identification panel 310 can be freely adjusted according to the actual situation, which is convenient for the subsequent data processing device 220 to quickly and accurately identify the identification panel 310 based on the real scene image picked by the AR device 100.

Note: The identification panel 310, the connecting member 320, and the fixing member 330 are not in connected with the strings.

As can be seen from FIG. 3, in this embodiment, the positioning devices for key position 300 is placed on the guzheng code. The user only needs to simply install the fixing member 330 on the guzheng code. The user does not need to re-tune the guzheng, which is convenient to use; in this embodiment, the position of the strings can be further determined by identifying the identification panel 310, and the identification panel 310 is located at the guzheng code. At this time, the playing area of the corresponding string can be determined according to the identification panel 310 (the right side of the guzheng code, the small head side of the guzheng).

This embodiment combines the tracking registration technology based on markers and the tracking registration technology based on natural features to realize the identification and positioning of strings and codes. The specific implementation method is as follows:

firstly, extracting the corresponding string feature points set from the pre-defined guzheng template image, and then extracting the corresponding string feature points set from each frame of real scene data acquired by the AR device 100, and track the spatial poses of the AR device 100 by matching the feature points sets to each other to complete a tracking registration of the guzheng strings; the feature point detection and feature matching methods are existing technologies, so they are not described in detail in this embodiment.

The positioning device for key position 300 is placed at each guzheng code in advance, and the identification panel 310 displays a marker with the content of the marker. The data processing device 220 recognizes the marker in the real scene data collected by the AR device 100 and obtains the fixed-point information of the markers, and then reconstructs the predefined marker coordinates to the real scene marker coordinates according to the principle of affine invariance of the graph The position change matrix to complete the tracking and registration of the guzheng code.

The tracking registration results of the obtained strings are screened based on the tracking registration results of the guzheng codes, that is, the strings passing through the guzheng codes are extracted, and the string distribution data is generated according to the extraction results and the tracking registration results of the guzheng codes.

Figure 4:
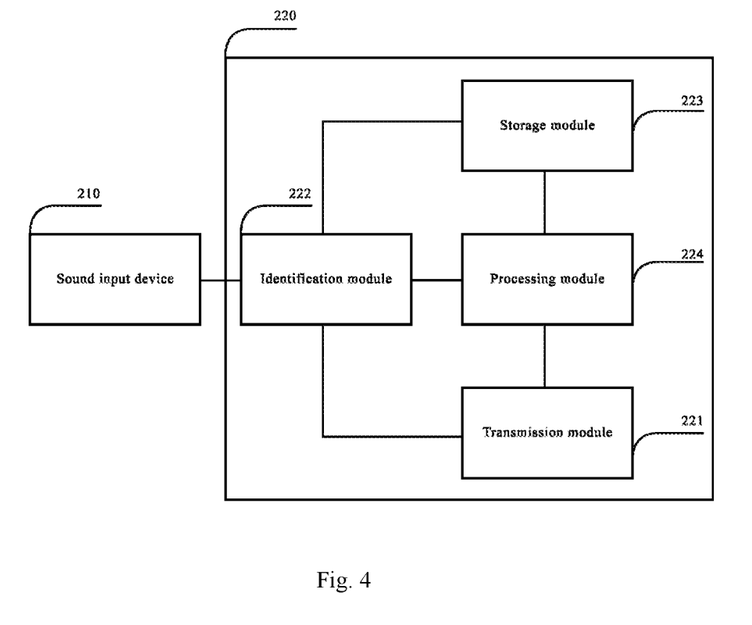
FIG. 4 is a schematic diagram of module connections of the guzheng peripheral device 200 in FIG. 1.

As shown in FIG. 4, the data processing device 220 includes a transmission module 221, an identification module 222, a storage module 223, and a processing module 224, wherein the identification module 222 and the sound input device 210, the transmission module 221, the storage module 223, and the processing module are respectively signally connected, and the processing module 224 is also connected to the transmission module 221 and the storage module 223 respectively, and the transmission module 221 is connected to the AR device 100;

The data processing device 220 is used to process the real scene data collected by the AR device 100, specifically:

The transmission module 221 receives the real scene data and sends it to the identification module 222;

The identification module 222 receives and identifies the real scene data to obtain a string distribution data.

The data processing device 220 is also used to process a sound data collected by the sound input device 210, specifically:

The voice input device 210 is used to collect the sound data when the user plays and send the sound date to the identification module 222;

The identification module 222 is configured to receive and identify the sound data and obtain a tone data;

The processing module 224 is configured to retrieve the operation instruction associated with the tone data from the storage module 223, execute the operation instruction, and generate virtual data according to the operation instruction.

The data processing device 220 is also used to generate virtual data based on the tone data and string distribution data and control a display of the virtual data, specifically:

The processing module 224 retrieves the operation instruction associated with the tone data from the storage module 223, executes the operation instruction, generates virtual data according to the operation instruction, and sends the virtual data to the AR device 100 through the transmission module 221, and controls the AR device 100 to superimpose and display the virtual data and the real scene data.

The operation instruction include playing guidance instruction and evaluation instruction.

In this embodiment, the storage module 223 is used to store all data used to supplementary teaching, such as music score data, basic music theory data, association rule data, and practice music score data.

The music score data includes fingering data, note data and time interval data of adjacent notes (standard time interval data between two adjacent notes);
basic music theory data includes pre-stored guzheng tone and fingering 3D animation;
the association rule data includes pre-defined operation association rules, pre-defined string association rules and pre-defined fingering association rules;
the practice music score data includes fingering practice score data and rhythm practice score data;

In actual use, the identification module 222 matches a received sound information with the pre-stored guzheng tones, obtains a matched guzheng tones, uses the guzheng tones as the tone data, and extracts the string code associated with the guzheng tones and musical notes.

The processing module 224 can determine and respond to the user's operation according to the association relationship between a string encoding and the operation data, to obtain a corresponding operation instruction.

In this embodiment, string guidance data, fingering guidance data, and/or numbered musical notation display data can be generated according to the operation instruction, and superimposed and displayed by the AR device 100, specifically:
the processing module 224 obtains operation data according to the user's actions, and extracts corresponding music score data based on the operation data;
when the numbered musical notation is displayed, the processing module 224 retrieves the corresponding numbered musical notation display data from the storage module 223, and controls the AR device 100 to superimpose the numbered musical notation display data on top of the guzheng based on the guzheng string distribution data, so that the AR device 100 displays a corresponding numbered musical notation for the users.
when performing the string guidance, according to the note data in the score data, the processing module 224 acquires a string number associated with the note data and generates string guidance data, the string guidance data includes a string position data (string number), a virtual prompt data (a symbol used to prompt the user to play the string) and the time interval data of adjacent notes;

The AR device 100 superimposes the virtual prompt data to the corresponding strings according to the string position data based on the guzheng string distribution data and the time interval data of adjacent notes, achieving string guidance.

When performing fingering guidance, according to the fingering data in the score data, the processing module 224 obtains the fingering three-dimensional animation associated with the fingering data, and generates fingering guidance data in combination with the above-mentioned string number, the fingering guidance data includes string position data (string number), fingering three-dimensional animation and time interval data of adjacent notes;

In this embodiment, based on the guzheng string distribution data and the time interval data of adjacent notes, the AR device 100 superimposes the three-dimensional fingering animation on the corresponding string according to the string position data, to realize the common guidance of the string and fingering.

For example, after the user selects a certain score from the music score list by moving the strings, the processing module 224 extracts the fingering data, the note data, the time interval data of adjacent notes, and numbered musical notation display data corresponding to the selected score from the storage module 223, obtains string position data corresponding to each note based on the note data, acquires a three-dimensional fingering animation corresponding to a fingering based on the fingering data, and generates string guidance data, fingering guidance data, and musical notation display data as the virtual data;

The AR device 100 receives the above virtual data and performs superimposed display based on the string distribution data. At this time, the numbered musical notation display data is located above the guzheng. The three-dimensional fingering animation and the virtual prompt data for guiding the strings are superimposed on the corresponding strings. The user can follow the numbered musical notation display data and the virtual prompt data and imitate the corresponding fingering three-dimensional animation to learn guzheng playing.

During the entire playing process, the identification module 222 collects the sound data played by the user in real time through the sound input device 210, matches the obtained sound data with the prestored guzheng tone in the storage module 223, and obtains tone data; the processing module 224 matches the tone data with the note data of the corresponding music score to locate a current playing progress, and updates the string guidance data, the fingering guidance data, and the notation display data based on the current playing progress.

Note: The storage module 223 can also store virtual scene data and virtual game data;

The processing module 224 obtains an operation data according to user's actions, extracts the virtual scene data selected by the user from the storage module 223 according to the operation data, and sends the virtual scene data to the AR device 100. The AR device 100 superimposes the virtual scene data based on the string distribution data outside the guzheng, that is, to provide the user with a virtual playing environment (such as natural environment, stage, etc.) outside the guzheng.

The processing module 224 obtains the operation data according to user's actions, extracts virtual game data selected by the user from the storage module 223 according to the operation data, and sends the virtual game data to the AR device 100. The AR device 100 superimposes the virtual game data based on the string distribution data at the guzheng, that is, to provide the user with an interactive game of guzheng playing.

Figure 5:
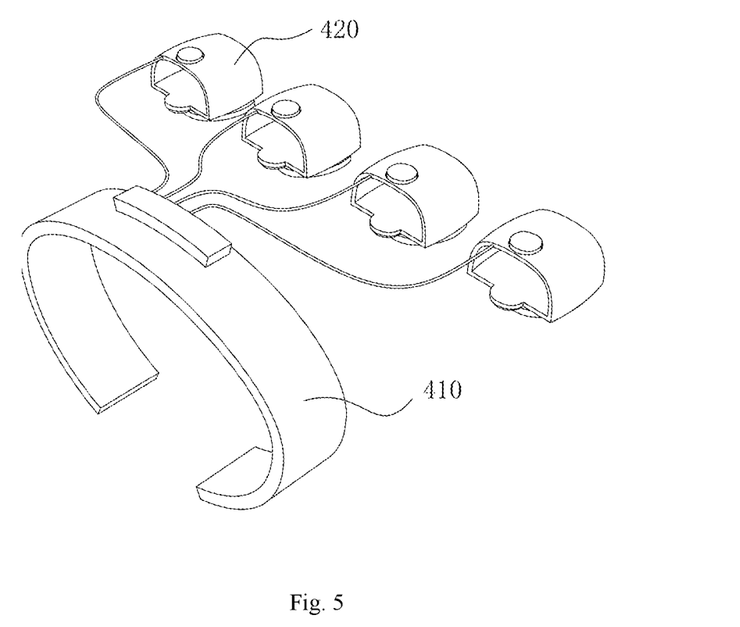
FIG. 5 is a schematic structural diagram of the somatosensory device 400 in FIG. 1.

In another embodiment, the teaching system further includes a somatosensory device 400, and the somatosensory device 400 is signally connected to the transmission module 221;

The processing module 224 is further configured to generate fingering somatosensory guidance data according to the operation instruction, and send the fingering somatosensory guidance data to the somatosensory device 400 through the transmission module 221 to control the somatosensory device 400 to perform somatosensory feedback according to the somatosensory guidance data.

In this embodiment, the storage module 223 stores the somatosensory feedback data corresponding to fingerings one by one, and the processing module 224 extracts a corresponding somatosensory feedback data from the storage module 223 based on the fingering data from the acquired music score data to generate fingerings somatosensory guidance data. The fingering somatosensory guidance data includes somatosensory feedback data and time interval data of adjacent notes;

According to the somatosensory feedback data, the somatosensory device 400 performs a vibration prompting based on the time interval data of adjacent notes. The somatosensory feedback and the above-mentioned three-dimensional fingering animation can be individually/commonly directed.

Figure 6:
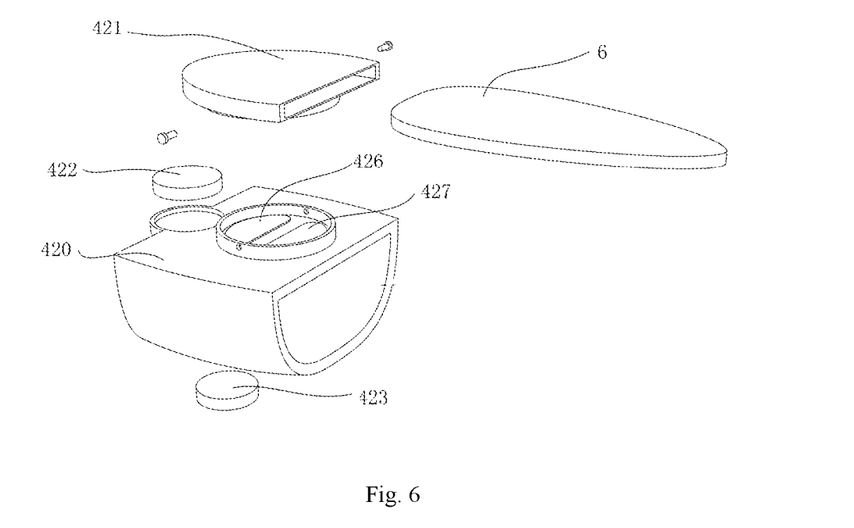
FIG. 6 is a first explosion schematic diagram of the somatosensory smart finger of FIG. 5.
Figure 7:
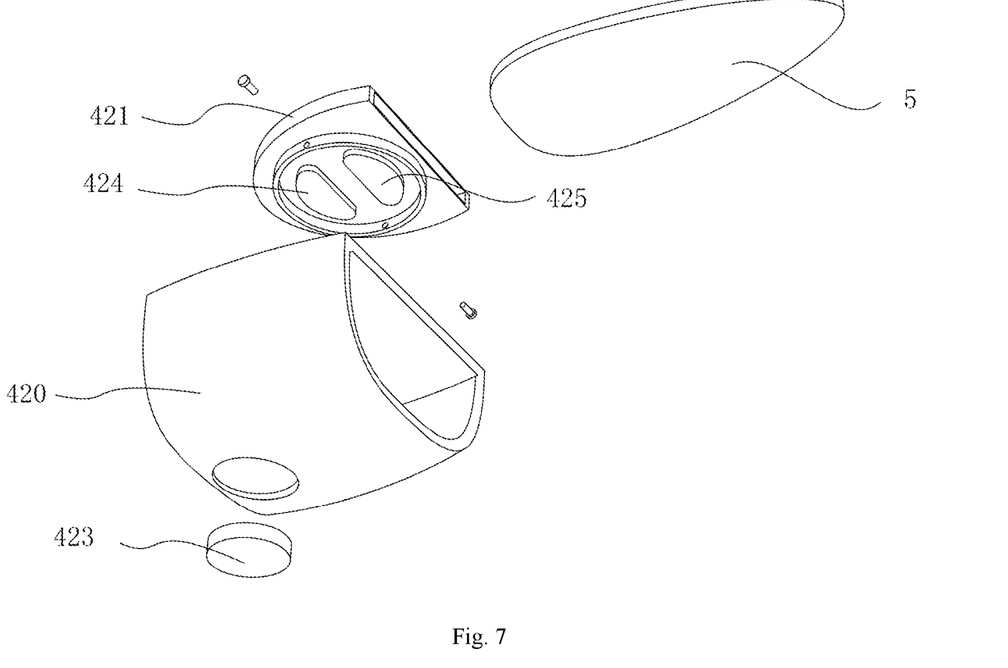
FIG. 7 is a second explosion schematic diagram of the somatosensory smart finger of FIG. 5.
Figure 8:
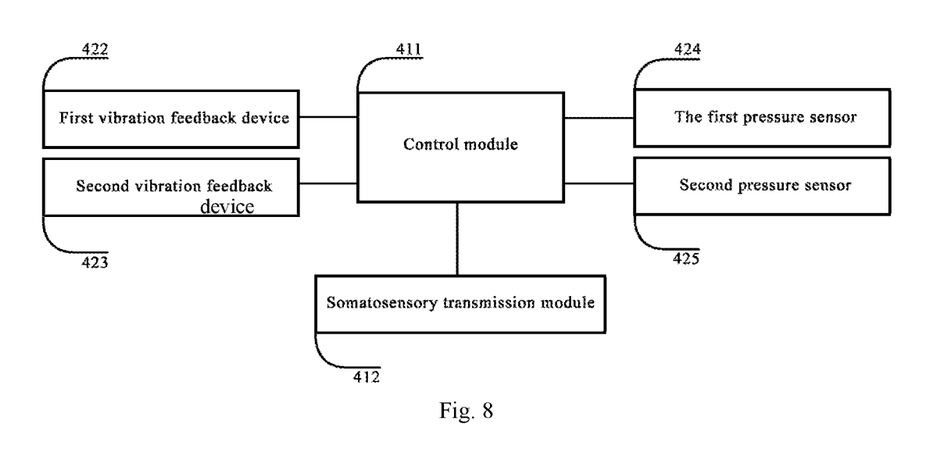
FIG. 8 is a schematic diagram of the module connections of the somatosensory smart finger in FIG. 5.

In this embodiment, as shown in FIG. 5, the somatosensory device 400 includes a wristband 410 and four somatosensory smart fingers. Each somatosensory smart finger includes a smart finger 420, a pick installation sleeve 421, a first vibration feedback device 422 and a second vibration feedback device 423;

The specific structure of the somatosensory smart fingers is shown in FIGS. 6 and 7. The smart fingers 420 is provided with a pick installation sleeve 421, a first vibration feedback device 422 and a second vibration feedback device 423, wherein all the first vibration feedback devices 422 are located on a same side of the pick installation sleeve 421, all the second vibration feedback devices 423 are located on an opposite side of the pick installation sleeve 421, and the pick installation sleeve 421 is used to install the pick;

The wristband 410 is provided with a somatosensory transmission module 412, a battery module, and a control module 411, wherein the battery module supplies power to the first vibration feedback device 422, the second vibration feedback device 423, the somatosensory transmission module 412 and the control module 411, that is, to power the somatosensory device 400. The control module 411 is signally connected to the first vibration feedback device 422, the second vibration feedback device 423, and the somatosensory transmission module 412 respectively, and the somatosensory transmission module 412 is signally connected to the transmission module 221;

The control module 411 is used to receive fingering somatosensory guidance data through the somatosensory transmission module 412 and control the first vibration feedback device 422 and the second vibration feedbacker 423 to perform a vibration feedback according to the fingering somatosensory guidance data.

In actual use, the user can insert a pick into the pick installation sleeve 421, and then use the corresponding fingering to move the strings based on the vibration feedback performed by the first vibration feedback device 422 and the second vibration feedback device 423;

In this embodiment, x1 represents the first vibration feedback device 422, and x2 represents the second vibration feedback device 423;
x includes a, b, c, and d, wherein a represents a thumb, b represents an index finger, c represents a middle finger, and d represents a ring finger;

Each fingering specifically corresponds to a vibration area of a vibration feedback device on the somatosensory device 400, such as: hold (托 in Chinese), a2; split (劈 in Chinese), a1; wipe (抹 in Chinese), b2; pick (挑 in Chinese), b1; hook (勾 in Chinese), c2; tick (剔 in Chinese), c1; lift (提 in Chinese), d1; flick (摇指 in Chinese), alternate response of a1 and a2; or alternate response of b1 and b2.

In this embodiment, an upper mounting member (shown as a circle in FIG. 6), a first pressure sensor 424, and a second pressure sensor 425 (as shown in FIG. 7) are provided on the lower surface of the pick installation sleeve 421. The first pressure sensor 424 is located on the side away from the pick, the second pressure sensor 425 is located on a side near the pick, and the first pressure sensor 424 and the second pressure sensor 425 are both signally connected to the control module 411;

An upper surface each of the smart fingers 420 is provided with a lower mounting member (as shown by a circle in FIG. 6), a first trigger 426 and a second trigger 427 (as shown in FIG. 6). A first trigger 426 corresponds to the first pressure sensor 424, the second trigger 427 corresponds to the second pressure sensor 425, and the lower mounting member is rotatably connected to the upper mounting member, so that when a pick move the strings, the first pressure sensor 424 squeeze the first trigger 426, or the second pressure sensor 425 squeeze the second trigger 427;

Note: The upper mounting member and the lower mounting member are used to install the pick installation sleeve 421 at the smart finger 420; and when the pick moves the strings, the first pressure sensor 424 can squeeze the first trigger 426 or the second pressure sensor 425 can squeeze the second trigger 427;

The control module 411 receives a pressure data detected by the first pressure sensor 424 and the second pressure sensor 425, and sends the obtained pressure data to the data processing device 220 through the somatosensory transmission module 412. The data processing device 220 analyzes a fingering accuracy according to the pressure data.

In this embodiment, the pressure data detected by the first pressure sensor 424 and the second pressure sensor 425 can be used to determine a plucking situation of the pick, such as when a front end of the pick presses the strings (an lower surface of the pick is subjected to an upward force), a tail end of the pick will be depressed, at this time the first pressure sensor 424 will squeeze the first trigger 426, so as to determine the corresponding fingering according to the pressure data of the first pressure sensor 424 and the smart finger 420 on which it is located; Similarly, when picking strings by the front of the pick (the upper surface of the pick is subjected to an downward force), the tail end of the pick will be pressed upward, and the second pressure sensor 425 will squeeze the second trigger to determine the corresponding fingering according to the pressure data of the second pressure sensor 425 and the smart finger 420 on which it is located.

When the pick move the strings, the pick installation sleeve 421 rotates slightly, so the first trigger 426 and the second trigger 427 in this embodiment are designed are both in a convex structure, so that a pressure value of the first pressure sensor 424/the second pressure sensor 425 is exactly 0 or there is an initial pressure value when the pick is not being played, so that when the pick moves the strings, the first pressure sensor 424/the second pressure sensor 425 can detect a change in pressure. The control module 411 collects a pressure data through the first pressure sensor 424 and the second pressure sensor 425, and sends the pressure data to the transmission module 221 through the somatosensory transmission module 412 (the pressure data includes a smart fingers number, a pressure sensor number and a pressure value);

The identification module 222 includes an image identification unit, a sound identification unit, and a somatosensory identification unit that are connected to the processing module 224 and the storage module 223. The image identification unit and the somatosensory identification unit are both signally connected to the transmission module 221, and the sound identification unit and the sound input device 210 are signally connected.

The image identification unit is used to recognize the guzheng and the positioning devices for key position 300 in a real scene data to obtain a string distribution data;

The voice identification unit is used to recognize the sound data collected by the voice input device 210 to obtain a corresponding tone data;

The somatosensory identification unit is used to recognize the pressure data and obtain corresponding playing fingering data.

In actual use: the first pressure sensor 424 represented by X1, and the second pressure sensor 425 represented by X2; X includes A, B, C, and D, where A is the thumb, B is the index finger, C is the middle finger, and D is the ring finger; Hold, A2; Split, A1; Wipe, B2; Pick, B1; Hook, C2; Tick, C1; Lift, D1; Flick, A1A2 alternate response or B1B2 alternate response. Such fingering identification only needs to be judged and recognized by the pressure sensor of the feedback glove.

Continuous or double hold, A2 continuous response; continuous or double wipe, B2 continuous response; continuous or double hook, C2 continuous response; such fingering identification requires finger identification through the combination of somatosensory device 400 and voice identification, through the body sensory device 400 judges the fingering if is a combination of fingering, and through the sound recognition unit judges a difference between the tones, with the same tones being a continuous holds, continuous wipes or continuous hooks, and the differences in tone are double holds, double wipes or double hooks.

In another embodiment, the teaching system further includes a cloud server 500. The cloud server 500 is respectively connected to the transmission modules 221 of a plurality of data processing devices 220. The data processing device 220 is connected to other data processing devices through the cloud server 500 to perform a data interaction.

The operation instruction also include multi-player collaborative performance and instructor remote guidance;

When the operation instruction is a multi-player collaborative performance/instructor remote guidance, the processing module 224 inputs an video data of the user's performance through an external camera device, and also uses the sound input device 210 input such as a sound data of the user's performance, the obtained video data and sound data are synchronized to the cloud server 500 through the transmission module 221, and downloads the video data and sound data of the corresponding companion (coordinator/instructor/student) from the cloud server 500; the processing module 224 processes the obtained video data to obtain virtual video data, and each audio data is mixed to obtain a mixed audio data, the virtual video data is displayed through the AR device 100, and the mixed audio data is played through the AR device 100 or the peripheral sound device.

When the instructor remotely guides, the processing module 224 also collects the user's somatosensory data through the somatosensory device 400, synchronizes it to the cloud server 500 through the transmission module 221, and synchronously downloads the corresponding instructor's somatosensory data from the cloud server 500. A learner can not only feel the guidance of remote instructor through images and sounds, but also feel the real-time fingering and somatosensory response of remote instructor, to realize a more realistic remote guzheng teaching.

Embodiment 2

Figure 9:
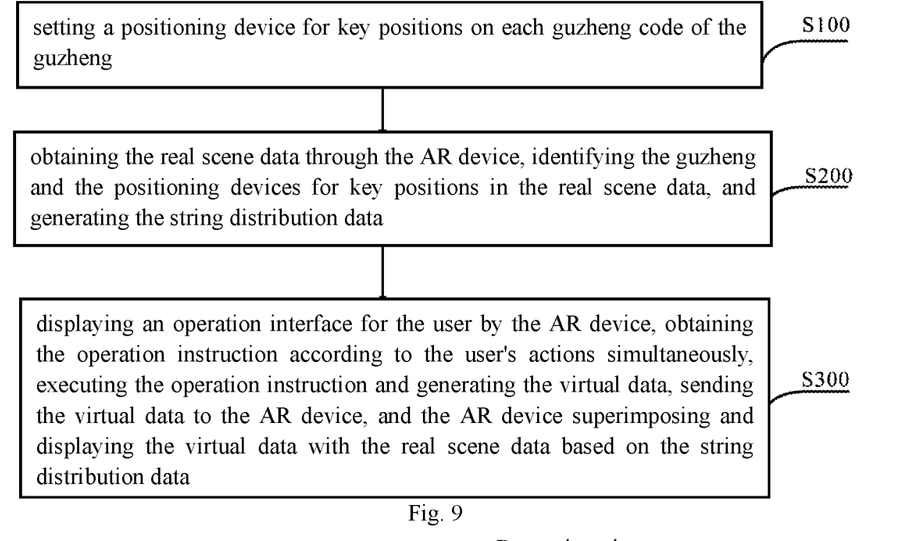
FIG. 9 is a schematic diagram of the workflow of an AR-based supplementary teaching method for guzheng of the present invention.

An AR-based supplementary teaching method for guzheng implemented based on the system described in Embodiment 1, as shown in FIG. 9, includes the following steps:

S100: set a positioning device for key position 300 on each guzheng code of guzheng;

S200: obtain a real scene data through the AR device 100, identify the guzheng and the positioning devices for key positions in the real scene data, and generate the string distribution data; S300: display an operation interface for a user through the AR device 100, at the same time obtain an operation instruction according to a user's actions, execute the operation instruction and generate the virtual data, send the virtual data to the AR device 100, and the AR device 100 superimposes and displays the virtual data with the real scene data based on the string distribution data.

This embodiment uses AR technology to improve the user's immersion. In this embodiment, a positioning device for key position 300 is provided on the guzheng code, so that the user does not need to retune the guzheng, which is convenient to use.

The teaching of guzheng is different from the learning of ordinary knowledge. The textbook knowledge cannot be simply displayed to students through AR technology, but the teaching of guzheng in real scenes needs to be taught. In reality, the shape of each guzheng is different. The positioning devices for key position 300 realizes an positioning of the guzheng strings to generate string distribution data, so that the AR device 100 superimposes and displays the virtual data based on the string distribution data, thereby being able to show the user a virtual scene corresponding to the guzheng.

In step S200, the specific method of generating string distribution data is as follows:
recognize the guzheng in the real scene data, obtain a guzheng morphological data, and identify the guzheng surface and strings in the guzheng morphological data;
recognize the positioning devices for key position 300 in the guzheng morphological data, obtain a positioning points, obtain the number and an arrangement order of the positioning devices for key positions 300 according to the positioning point, and determine the guzheng tone corresponding to each positioning point according to the number and arrangement order, and encode and record the strings passing through this positioning point to generate a string distribution data.

As can be seen from the above, the guzheng tone and the corresponding string position are bound through the positioning points, thereby generating string association rules.

Note that the guzheng tone is also associated with each note in advance.

In this embodiment, firstly, the overall morphological of guzheng is distinguished from the external environment area based on the existing image identification technology, and secondly, the surface and strings in the overall morphological of guzheng are recognized; because the strings are thin, the accuracy of direct identification is low, and cannot identify the playing area of the guzheng, so in this embodiment, a positioning devices for key position 300 is provided on the guzheng code, the key string positioning device 300 is recognized to realize a confirmation of the string, and the positioning devices for key position 300 is located at on the guzheng code, the playing area of the strings can be determined according to the identified positioning point and the corresponding strings.

In S300, the AR device 100 is used to display an operation interface for the user, and the specific steps for obtaining the operation instruction according to the user's actions are:

The AR device 100 displays an operation interface for the user, and simultaneously collects and recognizes sound data to obtain tone data; obtains operation data corresponding to the tone data according to a pre-defined operation association rule, and generates operation instruction based on the operation data;

The operation instruction includes playing guidance instruction and evaluation instruction.

Since different strings of guzheng correspond to different tones, the strings are mapped with operation data and tone in advance to generate operation association rules. The operation data includes upward/leftward, downward/rightward, cancellation, confirmation, etc.; The user selects a desired service by moving the strings. At this time, a corresponding operation instruction is obtained according to the user's choice;

In actual use, the AR device 100 displays an operation interface for the user, and the operation interface displays a list of services (playing guidance service and evaluation service) and operation instruction (the mapping relationship between strings and operation data), such as the virtual icons representing the operation data are superimposed and displayed on the strings, that is, icons such as upward/leftward, downward/rightward, cancellation, confirmation are superimposed on the corresponding strings.

The user can move the corresponding strings according to actual needs. At this time, the sound data is collected and recognized to obtain the tone data, and the user's operation is identified according to the pre-defined operation association rules, the service selected by the user is obtained, and the corresponding operation instruction is generated.

S310. When the operation instruction is a playing guidance instruction, the virtual data includes string guidance data, fingering guidance data, and/or numbered musical notation display data, and the specific steps for generating virtual data by executing the operation instruction at this time are:

acquire an operation data according to the user's actions, and extracting corresponding music score data based on the operation data, the music score data including note data and fingering data;

generating string guidance data, fingering guidance data and/or numbered musical notation display data according to the playing guidance instruction, including:

extract the corresponding string position according to the note data based on the pre-defined string association rules, and generate a string guidance data;

based on the pre-defined fingering association rules, extract a corresponding fingering 3D animation according to the fingering data to generate a fingering display guidance data;

extract the musical notation display data corresponding to the music score data. In the actual operation process, a music score list is extracted according to the playing guidance instruction, and the music score list is displayed through the AR device 100. At this time, the user moves the strings to select the music score from the music score list to obtain a music score information;

the playing guidance instruction includes at least one of a score display command, a string guidance command, and a fingering guidance command;

A. When the play guidance instruction includes a score display command:

Extracting the musical notation display data and note data corresponding to the music score data, displaying the musical notation display data through the AR device 100, and at the same time collecting and recognizing sound data in real time to obtain tone data, according to the matching of the tone data and the note data, generating music score progress positioning data, updating a displayed musical notation display data according to the music score progress data; this embodiment can not only display the music notation corresponding to the music score for the user through AR technology, but also recognize the sound data played by the user, the automatic line-wrapping/page-turning of the numbered musical notation based on the sound data. Note that the tone data is matched with the note data, and generating music score progress positioning data is a prior art, so it will not be described in detail in this specification.

Since the beginners of guzheng have a weak sense of rhythm and are unskilled in playing, such as automatic line-wrapping/page-turning of the numbered musical notation according to standard musical notation playback data, users often cannot keep up with the playback progress of musical notation. Based the sound data played by the user in this embodiment can realize the automatic line-breaking/page-turning of the musical notation, which can improve the user's experience and meet the user's needs.

B. When the play guidance instruction includes a string guidance instruction:

Extracting the note data corresponding to the music score data, extracting corresponding string positions according to the note data based on pre-defined string association rules, and generating string guidance data;

In this embodiment, string guidance data is generated according to the bar, that is, the string guidance data includes virtual prompt data, time interval of adjacent notes, and string position data; According to the string guidance data, the AR device 100 superimposes the virtual prompt data on the strings to be played in sequence based on the time interval data of adjacent notes. At this time, the user can see the strings corresponding to the music score one by one through the AR device 100, and then the user can play following the fingering according to the key position of the string that the user sees.

Figure 10:
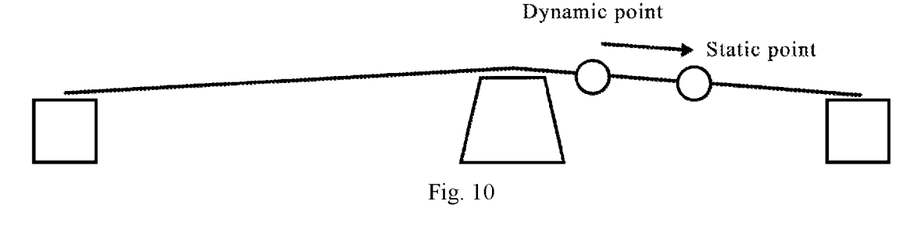
FIG. 10 is a schematic diagram of string guidance by dynamic points and static points in Embodiment 2.

Those skilled in the related field can set the style of the virtual prompt data according to actual needs, such as dots and lines, and those skilled in the related art can also set the guide mode according to the actual needs. This embodiment includes the following two guide modes:

Guide by bars: At this time, the virtual prompt data is linear, which is the same length as the playing area of the corresponding string, and the virtual prompt data is sequentially superimposed on the corresponding string according to the note data and string position data for display, so continuously demonstrate the key information of a string for the user, and then the user plays it according to the music score;

Guide by strings: At this time, the virtual prompt data includes dynamic points and static points (as shown in FIG. 10), and the static points identify the best playing points of the corresponding strings (the method of determining the best playing points is the existing technology, so no more details in this specification), the dynamic point moves along the corresponding string to the static point, and the movement duration is used to reflect its playing rhythm, that is, when the dynamic point and the static point are superimposed on a certain string for displaying, indicating that the string is the next string to be played. When the dynamic point moves to the static point, it indicates that this string needs to be currently played;

It can be seen from the above that the design of the string guidance data in this embodiment can guide the user to the key position of the string to be played according to the music score, and in this embodiment, by designing the dynamic point and the static point, the user is guided to the string at the same time, it can also guide the user's playing rhythm.

In this embodiment, the string guidance data may also include an error feedback data, that is, if the user still plays a wrong key position during the playing process according to the guidance of the virtual prompt data, or does not play when the dynamic point and the static point coincide, At this time, the error feedback data is superimposed on the corresponding string for display. The error feedback data can be linear (the color is different from the virtual prompt data), and can also be "!", "X" and other signs, this embodiment does not make specific restrictions.

The method of judging whether the user's string key position is correct is:
collecting the sound data during the user's playing process, identifying the sound data, obtaining the tone data, and matching the tone data with the note data, when the match is successful, it is judged that the string key is played correctly, otherwise it is judged as error.

The method to judge whether the user plays the rhythm correctly is:
extracting the standard interval time between adjacent notes and the actual playing interval time of the user. When the absolute value of the difference between the standard interval time and the playing interval time is greater than the pre-defined interval threshold, it is determined that the playing rhythm is wrong.

The standard interval time is the time taken for the dynamic point to move to the static point, and a person skilled in the related art can set the interval threshold according to actual needs.

C. When the playing guidance instruction includes a fingering instruction command, there are two ways to perform fingering instruction based on AR display and fingering instruction based on somatosensory feedback.

C1. Fingering guidance based on AR display:
extract the fingering data corresponding to the music score data, extract the corresponding fingering three-dimensional animation according to the fingering data based on pre-defined fingering association rules, and generate fingering display guidance data;
fingering association rules are used to associate fingering names with corresponding fingering 3D animations;
the fingering data refers to the respective fingerings in the process of playing the corresponding score. In this embodiment, the corresponding fingering three-dimensional animations are sequentially extracted according to the fingering data, and the obtained fingering three-dimensional animations are displayed by the AR device 100;

In this embodiment, the fingering instruction command may be associated with the above step A and/or step B, so that the three-dimensional fingering animation is switched according to the sound data played by the user (in this case, the note data corresponds to the fingering data one-to-one).

That is, the user recognizes the sound data played by the user to obtain tone data, matches the tone data and the note data, and generates music score progress positioning data, and switches the displayed three-dimensional fingering animation based on the music score progress positioning data.

In this embodiment, the fingering instruction command may be associated with step B, so that fingering guidance is performed at the same time as string guidance (at this time, note data corresponds to fingering data one-to-one).

That is, based on the string position data, the obtained three-dimensional fingering animation is superimposed on the corresponding string for guidance.

As can be seen from the above, this implementation provides users with three-dimensional dynamic fingering instruction through AR technology, which is convenient for users to accurately understand the fingering points.

C2. Fingering guidance based on somatosensory feedback:
Based on the pre-defined fingering association rules, corresponding somatosensory feedback data is extracted according to the fingering data, fingering somatosensory guidance data are generated, and the fingering somatosensory guidance data is sent to the somatosensory device 400, and the somatosensory device 400 is guided according to the fingering somatosensory guidance data. For specific guidance methods, see Embodiment 1. In this embodiment, the description will not be repeated.

S320. When the operation instruction is an evaluation instruction, the virtual data includes string key position accuracy, fingering accuracy, and rhythm sense. At this time, the specific steps of executing the operation instruction to generate a virtual data are:

S321. acquire an operation data according to the user's actions, and extract corresponding music score data based on the operation data. The music score data includes note data, fingering data, and a pre-defined standard interval between two notes;

The pre-defined two notes include, but are not limited to, two adjacent notes, the first note and the last note of the bar, the first note and the last note of the entire song.

S322. During the user's playing process, collect and recognize sound data to obtain tone data, and at the same time collect pressure data through the somatosensory device 400, and identify the pressure data to obtain playing fingering data;

The pressure data is used to determine which side of the pick is to move the string, to determine the playing fingering data for playing based on the fingering principle;

S323: Match the tone data with the note data, and generate string key position accuracy according to the matching result;

That is, calculate a proportion of the correct notes played in the entire song to the total notes, and use the results as the string key position accuracy;

S324. Match the playing fingering data with the fingering data, and generate fingering accuracy according to the matching result;

That is, calculate the proportion of correct fingering played in the whole song to the total fingering, and use the result as fingering accuracy;

S325. Calculate the time difference between the pre-defined two notes according to the tone data, obtain the actual interval duration, and generate a sense of rhythm according to the actual interval duration and the standard interval duration.

In this embodiment, the whole song is taken as an example, that is, two notes are pre-defined as the first note and the last note of the music score, and the standard interval length is extracted, that is, the standard length of the entire song, and the total number of times the user plays the entire song is recorded. Use time as the actual interval duration, and calculate the absolute value of the difference between the actual interval duration and the standard interval duration. The larger the absolute value obtained, the worse the sense of rhythm;

In this embodiment, the ratio of the absolute value of the difference between the actual interval duration and the standard interval duration to the standard interval duration is used as the characteristic value of the sense of rhythm.

In this embodiment, when the operation instruction is an evaluation instruction, the virtual data includes string key position accuracy, fingering accuracy, and rhythm sense. At this time, after executing the operation instruction to generate virtual data, a feedback guidance step is further included, the specific steps are:
a. Obtain the string key position accuracy, fingering accuracy, and rhythm;

b. Compare the string key position accuracy with the pre-defined string key position accuracy threshold, compare the fingering accuracy with the pre-defined fingering accuracy threshold, and compare the rhythm with the pre-defined rhythm threshold, and get the comparison result;

The above-mentioned string key position accuracy threshold, fingering accuracy threshold and rhythm threshold can be set according to actual conditions, and this embodiment does not limit them;

c. When the fingering accuracy is less than the pre-defined fingering accuracy threshold, extract fingering practice score data;

The fingering practice score data is an exercise score with same fingering but in different string positions. In this embodiment, repeated guidance exercises are performed according to the fingering practice score data to improve the user's fingering proficiency and accuracy.

d. When the string key position accuracy is less than the pre-defined string key position accuracy threshold, and the fingering accuracy is less than the pre-defined fingering accuracy threshold, extract the wrong paragraph and slow down the playback speed to practice;

When the accuracy of the strings is low and the accuracy of the fingering is also low, it means that the speed of the score is too fast and the user cannot learn effectively. Therefore, the wrong part is picked out separately, and the playback speed is slowed down for repeated guided practice.

e. When the string key position accuracy is less than the pre-defined string key position accuracy threshold, and the fingering accuracy is greater than or equal to the pre-defined fingering accuracy threshold, extract the erroneous section, practice at normal speed first, and then increase the playback speed to practice;

When the accuracy of the strings is low but the accuracy of the fingering is high, it means that the user has the wrong string position to play inertia, so the wrong part is picked out separately, and repeated practice at the normal playback speed to correct it, and then accelerate the playback speed to strengthen stringing habits.

f. When the rhythm sense is greater than the pre-defined rhythm sense threshold, the rhythm sense practice score data corresponding to the rhythm sense practice rule is extracted according to the pre-defined rhythm sense practice rule.

The pre-defined rhythm practice rule is that the rhythm sense is graded in advance. If the data corresponding to the rhythm sense is greater than 50%, the rhythm sense is poor. At this time, simpler rhythm practice score data is provided for users to practice, for example, scores for different string positions but the same fingering and rhythm; when the data corresponding to the sense of rhythm is greater than 20% and less than or equal to 50%, it means poor sense of rhythm. At this time, complex rhythm practice score data is provided for users to practice, for example, scores for different string positions and different fingerings, but the same rhythm for practicing.

A person skilled in the related art may grade the rhythm sense by himself and set rhythm sense practice score data corresponding to each level, which is not limited in this embodiment.

This embodiment can detect the accuracy of string keys and fingering during the user's playing, and can also calculate the user's sense of rhythm, and feedback the calculation results to the user, so that the user can understand the weak points in the learning of guzheng, and can also generate corresponding practice music scores for users to practice.

The embodiments in this specification are described in a progressive manner. Each embodiment focuses on the differences from other embodiments, and the same or similar parts between the embodiments may refer to each other.

It should be noted:

The reference to "one embodiment" or "embodiment" in the specification means that a feature, structure, or characteristic described in connection with the embodiment is included in at least one embodiment of the present invention. Therefore, the phrases "one embodiment" or "embodiments" appearing in various places throughout the specification do not necessarily all refer to the same embodiment.

Although the preferred embodiments of the present invention have been described, those skilled in the art can make additional changes and modifications to these embodiments once they learn the basic inventive concept. Therefore, the appended claims are intended to be interpreted as including the preferred embodiments and all changes and modifications falling within the scope of the present invention.

In addition, it should be noted that the specific embodiments described in this specification may have different parts, shapes of parts, names taken, etc. Any equivalent or simple changes made according to the structure, features and principles described in the patent concept of the present invention are included in the protection scope of the present invention. Those skilled in the art to which the present invention pertains can make various modifications or additions to the described specific embodiments or substitute in a similar manner, as long as they do not deviate from the structure of the present invention or go beyond the scope defined by the claims, All should belong to the protection scope of the present invention.

What is claimed is:

1. An AR-based supplementary teaching system for guzheng, comprising an AR device, a data processing device, and a plurality of positioning devices for key positions, wherein the data processing device is signally connected to the AR device, the positioning devices for key positions are installed on a guzheng code, and each of the positioning devices for key positions corresponds one-to-one with the guzheng code;

the AR device is used to obtain a real scene data;

the data processing device is used to identify the guzheng and the positioning devices for key positions in the real scene data, generating a string distribution data; the data processing device is also used to obtain an operation instruction based on user's actions, executing the operation instruction, and generating a virtual data; and the AR device is also used to superimpose and display the virtual data with the real scene data based on the string distribution data, wherein the system further comprises a somatosensory device, the somatosensory device is signally connected to the data processing device;

the data processing device also used to generate a fingering somatosensory guidance data according to the operation instruction, and control the somatosensory device to perform a somatosensory feedback according to the somatosensory guidance data, the somatosensory device comprises a wristband and four smart fingers;

each of the smart fingers is provided with a pick installation sleeve, a first vibration feedback device and a second vibration feedback device, wherein all first vibration feedback devices are located on a same side of the pick installation sleeves, all second vibration feedback devices are located on an opposite side of the pick installation sleeves, and each of the pick installation sleeves is used to install a pick;

the wristband is provided with a somatosensory transmission module, a battery module, and a control module, wherein the battery module supplies power to the first vibration feedback devices, the second vibration feedback devices, the somatosensory transmission module, and the control module; the control module is signally connected to the first vibration feedback devices, the second vibration feedback devices, and the somatosensory transmission module respectively; and the somatosensory transmission module is signally connected to the transmission module;

the control module is used for receiving fingering somatosensory guidance data by the somatosensory transmission module, and controlling the first vibration feedback devices and the second vibration feedback devices to perform a vibration feedback according to the fingering somatosensory guidance data.

2. The AR-based supplementary teaching system for guzheng according to claim 1, wherein the system further comprises a sound input device, the sound input device is signally connected to the data processing device;

the voice input device is used to collect a sound data when the user plays and send the sound data to the data processing device;

the data processing device is configured to identify the sound data, generate a tone data, retrieve the operation instruction associated with the tone data, execute the operation instruction, and generate the virtual data.

3. The AR-based supplementary teaching system for guzheng according to claim 2, wherein the data processing device comprises a transmission module, an identification module, a storage module, and a processing module, wherein the identification module is signally connected to the sound input device, the transmission module, the storage module, and the processing module respectively, the processing module is also signally connected to the transmission module and the storage module respectively, and the transmission module is signally connected to the AR device;

the identification module is used for receiving and identifying the sound data to obtain the tone data, and also for receiving and identifying the real scene data to obtain the string distribution data;

the processing module is used for retrieving the operation instruction associated with the tone data from the storage module, executing the operation instruction, and generating the virtual data according to the operation instruction; and also for controlling the AR device to superimpose and display the virtual data with the real scene data;

the virtual data comprises a string guidance data, a fingering guidance data, and a numbered musical notation display data.

4. The AR-based supplementary teaching system for guzheng according to claim 1, wherein a lower surface of each of the pick installation sleeves is provided with an upper mounting member, a first pressure sensor, and a second pressure sensor; the first pressure sensor is located on a side away from the pick, and the second pressure sensor is located on a side close to the pick side, the first pressure sensor and the second pressure sensor are both signally connected to the control module;

wherein an upper surface of each of the smart fingers is provided with a lower mounting member, a first trigger, and a second trigger; the first trigger corresponds to the first pressure sensor, and the second trigger corresponds to the second pressure sensor; the lower mounting member and the upper mounting member are rotatably connected, so that when the pick move the string, the first pressure sensor squeezes the first trigger or the second pressure sensor squeezes the second trigger;

wherein the control module is used to receive a pressure data detected by the first pressure sensor or the second pressure sensor, and send the obtained pressure data to the data processing device by the somatosensory transmission module, and the data processing device analysis a fingering accuracy according to the pressure data.

5. The AR-based supplementary teaching system for guzheng according to claim 1, wherein each of the positioning devices for key positions comprises an identification panel, a connecting member and a fixing member; the fixing member is provided with a notch matching a shape of the guzheng code, the fixing member is installed on an upper end of the guzheng code through the notch during positioning; and the identification panel is connected to the fixing member through the connecting member.

6. The AR-based supplementary teaching system for guzheng according to claim 1, wherein the system further comprises a cloud server;

the cloud server is in signal connection with a plurality of data processing devices, and each of the plurality of data processing devices performs data interaction with other data processing devices through the cloud server.

7. An AR-based supplementary teaching method is realized by using an AR-based supplementary teaching system for guzheng, comprising an AR device, a data processing device, and a plurality of positioning devices for key positions, wherein the data processing device is signally connected to the AR device, the positioning devices for key positions are installed on a guzheng code, and each of the positioning devices for key positions corresponds one-to-one with the guzheng code;

the AR device is used to obtain a real scene data;

the data processing device is used to identify the guzheng and the positioning devices for key positions in the real scene data, generating a string distribution data; the data processing device is also used to obtain an operation instruction based on user's actions, executing the operation instruction, and generating a virtual data; and the AR device is also used to superimpose and display the virtual data with the real scene data based on the string distribution data, the method comprises the following steps:

setting a positioning device for key positions on each guzheng code of the guzheng;

obtaining the real scene data through the AR device, identifying the guzheng and the positioning devices for key positions in the real scene data, and generating the string distribution data;

displaying an operation interface for the user by the AR device, obtaining the operation instruction according to the user's actions simultaneously, executing the operation instruction and generating the virtual data, sending the virtual data to the AR device, and the AR device superimposing and displaying the virtual data with the real scene data based on the string distribution data, wherein the system further comprises a somatosensory device, the somatosensory device is signally connected to the data processing device;

the data processing device also used to generate a somatosensory guidance data according to the operation instruction, and control the somatosensory device to perform a somatosensory feedback according to the somatosensory guidance data, the somatosensory device comprises a wristband and four smart fingers;

each of the smart fingers is provided with a pick installation sleeve, a first vibration feedback device and a second vibration feedback device, wherein all first vibration feedback devices are located on a same side of the pick installation sleeves, all second vibration feedback devices are located on an opposite side of the pick installation sleeves, and each of the pick installation sleeves is used to install a pick;

the wristband is provided with a somatosensory transmission module, a battery module, and a control module, wherein the battery module supplies power to the first vibration feedback devices, the second vibration feedback devices, the somatosensory transmission module, and the control module; the control module is signally connected to the first vibration feedback devices, the second vibration feedback devices, and the somatosensory transmission module respectively; and the somatosensory transmission module is signally connected to the transmission module;

the control module is used for receiving fingering somatosensory guidance data by the somatosensory transmission module, and controlling the first vibration feedback devices and the second vibration feedback devices to perform a vibration feedback according to the fingering somatosensory guidance data.

8. The AR-based supplementary teaching method according to claim 7, wherein the step of displaying an operation interface for the user by the AR device, obtaining the operation instruction according to the user's actions simultaneously comprises:

displaying an operation interface for the user by the AR device, and simultaneously collecting and identify a sound data to obtain a tone data; obtaining an operation data corresponding to the tone data according to a pre-defined operation association rule, and generating operation instruction based on the operation data;

the operation instruction comprises a playing guidance instruction and an evaluation instruction; when the operation instruction is the playing guidance instruction, the virtual data comprises a string guidance data, a fingering guidance data, and/or a numbered musical notation display data.

9. The AR-based supplementary teaching system for guzheng according to claim 3, wherein each of the positioning devices for key positions comprises an identification panel, a connecting member and a fixing member; the fixing member is provided with a notch matching a shape of the guzheng code, the fixing member is installed on an upper end of the guzheng code through the notch during positioning; and the identification panel is connected to the fixing member through the connecting member.

10. The AR-based supplementary teaching system for guzheng according to claim 4, wherein each of the positioning devices for key positions comprises an identification panel, a connecting member and a fixing member; the fixing member is provided with a notch matching a shape of the guzheng code, the fixing member is installed on an upper end of the guzheng code through the notch during positioning; and the identification panel is connected to the fixing member through the connecting member.

11. The AR-based supplementary teaching system for guzheng according to claim 3, wherein the system further comprises a cloud server;

the cloud server is in signal connection with a plurality of data processing devices, and each of the plurality of data processing devices performs data interaction with other data processing devices through the cloud server.

12. The AR-based supplementary teaching system for guzheng according to claim 4, wherein the system further comprises a cloud server;

the cloud server is in signal connection with a plurality of data processing devices, and each of the plurality of data processing devices performs data interaction with other data processing devices through the cloud server.

13. The AR-based supplementary teaching method according to claim 7, wherein the system further comprises a sound input device, the sound input device is signally connected to the data processing device;

the voice input device is used to collect a sound data when the user plays and send the sound data to the data processing device;

the data processing device is configured to identify the sound data, generate a tone data, retrieve the operation instruction associated with the tone data, execute the operation instruction, and generate the virtual data.

14. The AR-based supplementary teaching method according to claim 13, wherein the data processing device comprises a transmission module, an identification module, a storage module, and a processing module, wherein the identification module is signally connected to the sound input device, the transmission module, the storage module, and the processing module respectively, the processing module is also signally connected to the transmission module and the storage module respectively, and the transmission module is signally connected to the AR device;

the identification module is used for receiving and identifying the sound data to obtain the tone data, and also for receiving and identifying the real scene data to obtain the string distribution data;

the processing module is used for retrieving the operation instruction associated with the tone data from the storage module, executing the operation instruction, and generating the virtual data according to the operation instruction; and also for controlling the AR device to superimpose and display the virtual data with the real scene data;

the virtual data comprises a string guidance data, a fingering guidance data, and a numbered musical notation display data.

15. The AR-based supplementary teaching method according to claim 7, wherein a lower surface of each of the pick installation sleeves is provided with an upper mounting member, a first pressure sensor, and a second pressure sensor; the first pressure sensor is located on a side away from the pick, and the second pressure sensor is located on a side close to the pick side, the first pressure sensor and the second pressure sensor are both signally connected to the control module;

wherein an upper surface of each of the smart fingers is provided with a lower mounting member, a first trigger, and a second trigger; the first trigger corresponds to the first pressure sensor, and the second trigger corresponds to the second pressure sensor; the lower mounting member and the upper mounting member are rotatably connected, so that when the pick move the string, the first pressure sensor squeezes the first trigger or the second pressure sensor squeezes the second trigger;

wherein the control module is used to receive a pressure data detected by the first pressure sensor or the second pressure sensor, and send the obtained pressure data to the data processing device by the somatosensory transmission module, and the data processing device analysis a fingering accuracy according to the pressure data.

16. The AR-based supplementary teaching method according to claim 7, wherein each of the positioning devices for key positions comprises an identification panel, a connecting member and a fixing member; the fixing member is provided with a notch matching a shape of the guzheng code, the fixing member is installed on an upper end of the guzheng code through the notch during positioning; and the identification panel is connected to the fixing member through the connecting member.

* * * * *